US008209975B2

(12) United States Patent
Persson et al.

(10) Patent No.: US 8,209,975 B2
(45) Date of Patent: Jul. 3, 2012

(54) ARRANGEMENT FOR OPERATING A HYDRAULIC DEVICE

(75) Inventors: Bengt Goran Persson, Sandared (SE); Peter Nilsson, Boras (SE)

(73) Assignee: Parker-Hannifin Corporation, Cleveland, OH (US)

( * ) Notice: Subject to any disclaimer, the term of this patent is extended or adjusted under 35 U.S.C. 154(b) by 694 days.

(21) Appl. No.: 12/429,686

(22) Filed: Apr. 24, 2009

(65) Prior Publication Data

US 2009/0266067 A1 Oct. 29, 2009

(30) Foreign Application Priority Data

Apr. 29, 2008 (EP) .................................... 08155350

(51) Int. Cl.
*F16D 31/02* (2006.01)

(52) U.S. Cl. ................. 60/414; 60/413; 60/418; 60/419

(58) Field of Classification Search .................... 60/405, 60/413, 414, 417, 418, 419, 428, 449
See application file for complete search history.

(56) References Cited

U.S. PATENT DOCUMENTS 3,922,854 A 12/1975 Coeurderoy
3,956,891 A 5/1976 Karazija
3,963,039 A 6/1976 Coeurderoy
3,971,215 A 7/1976 Baron et al.
4,348,863 A 9/1982 Taylor et al.
4,430,859 A 2/1984 Hirsch
4,754,603 A 7/1988 Rosman
4,928,487 A 5/1990 Nikolaus
5,333,533 A 8/1994 Hosseini
5,477,677 A 12/1995 Krnavek
5,488,787 A 2/1996 Aoyagi et al.
5,865,028 A 2/1999 Klauk et al.
5,878,569 A 3/1999 Satzler
5,916,139 A 6/1999 Tieben
6,009,708 A 1/2000 Miki et al.
6,151,874 A 11/2000 Eis
6,151,894 A 11/2000 Endo et al.
6,266,959 B1 7/2001 Markwart
6,357,231 B1 3/2002 Duppong
6,378,301 B2 4/2002 Endo et al.
6,434,864 B1 8/2002 Epshteyn
6,502,393 B1 1/2003 Clifton et al.
6,584,769 B1 7/2003 Bruun
6,655,136 B2 12/2003 Holt et al.

(Continued)

FOREIGN PATENT DOCUMENTS

DE 102006046127 A1 4/2008

(Continued)

*Primary Examiner* — Michael Leslie

(74) *Attorney, Agent, or Firm* — Daniel J. Whitman; Robert J. Clark

(57) ABSTRACT

A fluid system includes a controllable first pump unit for supplying fluid pressure to at least one implement; a prime mover arranged to supply a driving torque to the first pump The first pump unit is arranged to supply fluid pressure to the implement. The fluid system further includes a controllable second pump unit connected to a fluid accumulator. The prime mover is arranged to supply a driving torque to the second pump unit in order to accumulate fluid pressure in the accumulator during periods of low demand. Fluid pressure from the accumulator is arranged to drive the second pump unit to assist the prime mover during periods of high demand in order to supply an additional driving torque in excess of the available driving torque from the prime mover.

18 Claims, 3 Drawing Sheets

U.S. PATENT DOCUMENTS

| | | | |
|---|---|---|---|
| 6,725,581 | B2 | 4/2004 | Naruse et al. |
| 6,739,127 | B2 | 5/2004 | Nippert et al. |
| 6,789,387 | B2 | 9/2004 | Brinkman |
| 6,854,268 | B2 | 2/2005 | Fales et al. |
| 6,938,414 | B1 | 9/2005 | Bruun |
| 6,973,781 | B2 | 12/2005 | Brown et al. |
| 6,983,592 | B2 | 1/2006 | Bruun |
| 7,007,465 | B2 | 3/2006 | Bruun |
| 7,086,226 | B2 | 8/2006 | Oguri |
| 7,124,576 | B2 | 10/2006 | Cherney et al. |
| 7,234,298 | B2 | 6/2007 | Brinkman et al. |
| 7,249,457 | B2 | 7/2007 | Raszga et al. |
| 7,269,944 | B2 | 9/2007 | Zhang et al. |
| 7,322,800 | B2 | 1/2008 | Roth |
| 7,325,398 | B2 | 2/2008 | Cherney |
| 7,412,827 | B2 | 8/2008 | Verkuilen |
| 7,434,391 | B2 | 10/2008 | Asam et al. |
| 7,444,809 | B2 | 11/2008 | Smith et al. |
| 7,634,911 | B2 | 12/2009 | Brinkman |
| 7,658,065 | B2 | 2/2010 | Smith et al. |
| 7,669,414 | B2 | 3/2010 | Loeffler |
| 2004/0000141 | A1 | 1/2004 | Nagura et al. |
| 2006/0156713 | A1 | 7/2006 | Kadlicko |
| 2007/0044462 | A1 | 3/2007 | Epshteyn |
| 2007/0074509 | A1 | 4/2007 | Zhang et al. |
| 2007/0079609 | A1 | 4/2007 | Brinkman et al. |
| 2008/0110166 | A1 | 5/2008 | Stephenson et al. |
| 2009/0025379 | A1 | 1/2009 | White |
| 2009/0100830 | A1 | 4/2009 | Schneider et al. |
| 2009/0101101 | A1 | 4/2009 | Iwamoto |
| 2009/0126360 | A1 | 5/2009 | Bordwell et al. |
| 2009/0165450 | A1 | 7/2009 | Cherney et al. |
| 2010/0000209 | A1 | 1/2010 | Wada et al. |
| 2010/0024411 | A1 | 2/2010 | Payne et al. |
| 2010/0154399 | A1 | 6/2010 | Bergstrom et al. |

FOREIGN PATENT DOCUMENTS

| | | | |
|---|---|---|---|
| EP | 1837528 | A1 | 9/2007 |
| WO | WO2006022043 | A1 | 3/2006 |
| WO | WO2006110068 | A1 | 10/2006 |
| WO | WO2008013466 | A1 | 1/2008 |
| WO | 2008037461 | A1 | 4/2008 |

ARRANGEMENT FOR OPERATING A HYDRAULIC DEVICE

CROSS-REFERENCE TO RELATED CASE

The present application claims the benefit of the filing date of European Patent Application No. 08155350.5, filed Apr. 29, 2008, the disclosure of which is expressly incorporated herein by reference.

TECHNICAL FIELD

The invention relates to a fluid system comprising a first pump unit for supplying fluid pressure to at least one implement, where a prime mover is arranged to supply a driving torque to the first pump unit. The prime mover is also arranged to supply a driving torque to a second pump unit in order to accumulate fluid pressure in an accumulator during periods of low demand, in order to assist the prime mover during periods of high demand.

BACKGROUND ART

Fluid systems for wheel loaders, forklift trucks, container handling machines and other machines or equipment are equipped with a prime mover for driving a fluid pump for instance via a gearbox. A problem with such a system is that the peak pressure is limited to the maximum fluid pressure supplied by the pump.

A prime mover is often connected to the pump or motor via a gearbox or a similar transmission arrangement, in order to achieve a desired rotational speed for driving the pump. When specifying a transmission system, the systems designer may have a problem, as both the transmission and the prime mover, such as an engine or electric motor, have to be sized for peak demands from the driven implement.

If the peak torque supplied to the pump is insufficient for providing the required fluid pressure to drive the implement, the result may be that the implement may not be able to support its load. This is at best annoying for the operator but could under certain conditions create a dangerous situation. If the torque supplied by the prime mover is too high, then the torque may exceed the maximum torque allowed by the gearbox manufacturer. During peak loading this could cause the gearbox to fail. This has resulted in many machine manufacturers selecting larger gearboxes than actually needed for the drive. For the same reasons, the size of the prime mover can also be oversized in relation to the average power required.

The invention aims to overcome the above problems by providing an improved hydraulic system that will make it possible to downsize transmissions and in some cases also the prime mover, while still being able to supply the peak torque demand required by the system.

DISCLOSURE OF INVENTION

The above problems have been solved by a method and an arrangement according to the appended claims.

According to a preferred embodiment, the invention relates to a fluid system comprising a controllable first pump unit, which may be a fixed or a variable displacement device, for supplying fluid pressure to at least one implement. The fluid system may be hydraulically, pneumatically or electrically operated and the at least one fluid implement may be any type of fluid operated device, such as a fluid cylinder or similar. A prime mover, such as a suitable combustion engine or electric motor, is arranged to supply a driving torque directly or indirectly to the first pump unit. The first pump unit may be installed on an outgoing power take off (PTO) or otherwise be arranged to supply fluid pressure to the implement fluid system. The fluid system further comprises a controllable second pump unit, which is preferably a variable displacement device, connected to a fluid accumulator. In the subsequent text and the appended claims the term “pump unit” is defined as a device that may be used either as a pump or as a pump and a motor. Unit of the latter type are sometimes termed “pump/motors”. According to the invention, at least the second pump unit must be a pump/motor. In the case of a variable displacement device, the pump unit can be switched between these operating modes by setting a swash plate angle in a positive or a negative direction. At a positive angle, the device operates as a pump, and at a negative angle, the device operates as a motor. The prime mover is further arranged to directly or indirectly supply a driving torque to the second pump unit. The second pump unit is arranged to supply fluid pressure to the accumulator to accumulate fluid pressure during periods of low demand. A period of low demand is defined as a period in time when the load on the implement is below a first predetermined value. The load may be measured as a fluid pressure level required for operating the implement. During periods of low demand, the available torque from the prime mover exceeds the torque required by the first pump unit to supply the fluid implement with sufficient fluid pressure. Fluid pressure from the accumulator is arranged to drive the second pump unit to assist the prime mover during periods of high demand in order to supply an additional driving torque in excess of the available driving torque from the prime mover. The prime mover and the first and the second pump units may be connected to a common drive shaft. A period of high demand is defined as a period when the load on the implement is above a first predetermined value. During periods of high demand, the available torque from the prime mover is less than the torque required by the first pump unit to supply the fluid implement with sufficient pressure. When the fluid implement is subjected to sudden peak loads or higher than normal loads, the torque required for supplying sufficient pressure from the first pump unit may be in excess of the maximum available torque from the prime mover. However, the combined torque from the prime mover and the additional torque from the second pump unit may be sufficient to drive the first pump unit to supply the fluid implement with sufficient pressure during peak loads or periods of higher than normal loads. In the subsequent text, the term “peak load” will be used for describing this operating condition. Typically, the duration of a peak load period will only last for a few seconds.

The second pump unit may be a separate unit or be installed in tandem, “piggy backed” onto the main implement pump, or be installed separately on one PTO if multiple PTO units are available. The pump displacement is preferably controlled by an electronic control system sensing the demand for power in the implement system. During periods of low energy demand, the control system may increase the second pump unit stroke in the positive direction to pump fluid into the accumulator and increase the stored pressure. The pressure in the accumulator may be monitored by means of a suitable pressure sensor, such as a pressure transducer. When a predetermined maximum pressure is sensed in the accumulator, the second pump unit stroke is set to zero to allow the device to idle in order to conserve energy. A controllable two-way valve with a non-return valve can be used to maintain stored fluid pressure in the accumulator. During periods of high power or high torque demand, the control system puts the second pump unit into a negative stroke and the accumulator charge pressure is released for providing additional torque on the drive shaft, as the second pump unit is now acting as a fluid motor.

The second pump unit may preferably be a variable displacement device, provided with suitable means for controlling the displacement, or stroke, of the pump in a positive and a negative direction. The second variable displacement device may be operated as pump when driven by the prime mover.

The first pump unit may preferably also be a variable displacement device provided with suitable means for controlling the displacement of the pump in a positive and a negative direction.

The second pump unit may also be operated as a pump driven by the first pump unit. This condition may occur when fluid pressure is recovered from the fluid implement. By operating the first pump unit as a motor, it may be used for driving the second pump unit for filling the accumulator.

The controllable first and second pump units are preferably electrically controlled. An electronic control unit may be provided for this purpose. The first pump unit may be controlled by a load sensing device on the implement. As the demand for fluid power from the implement increases, the stroke of the first pump unit may be adjusted in a positive direction to increase the pressure of the supplied fluid. If this is determined to be insufficient, the power output of the prime mover is increased. During a period of peak load on the implement, the pressure supplied by the first pump unit at maximum positive stroke, while being driven by the prime mover at maximum torque, may still not be sufficient. The second pump unit is then set at a negative stroke and a valve is controlled to supply fluid from the accumulator to drive the second pump unit as a motor. The additional torque supplied to the first pump unit may provide an increase in the pressure supplied to the implement. Additional torque may be supplied as long as the pressure sensor determines that there is sufficient fluid pressure in the accumulator. The electronic control unit may store a number of maps used for controlling the stroke of the first and second pump units and the speed of the prime mover under predetermined operating conditions.

Should the pressure drop below a predetermined level, the second pump unit can no longer operate as a motor and the stroke is set to zero. A warning signal may be generated in the electronic control unit and an alert may be issued to the operator, indicating that the system may not handle peak loads until the accumulator has been recharged.

The prime mover may be connected to a suitable transmission device arranged to drive first pump unit. One example of a suitable transmission is a hydrodynamic gearbox. This type of transmission or gearbox has a maximum allowable limit for torque transmitted by the transmission. On a hydrodynamic gearbox, the pump supplying the implement is mounted on a PTO drive connected to the gearbox primary drive side via a gear ratio which in most of cases is 1:1 with the prime mover. The allowed torque is determined by the construction of the gearbox and is in most cases limited to a lower torque than that available from the prime mover. However, the maximum driving torque supplied to the first pump unit by the prime mover and the second pump unit in combination is greater than the maximum driving torque that can be transmitted by the transmission.

According to a further embodiment, the hydraulic system may be placed in a energy saving mode during periods of low activity. Examples of such periods may be when the electronic control unit detects that there has been no demand for hydraulic pressure from the implement or that the operator has not provided any input to the controls over a predetermined period of time. The energy saving mode may be initiated after a predetermined period of time, as described above, or in response to detected state corresponding to a number of pre-programmed conditions stored in the electronic control unit. One condition that must be fulfilled for initiation of the mode is that the accumulator must be charged to or over a predetermined limit. This limit is determined in relation to the required power for enabling an engine start. Preferably the accumulator may be fully, or nearly fully, charged.

When the energy saving mode is initiated, an engine control unit will interrupt the fuel injection and/or the ignition of the prime mover. The prime mover is then stopped and the hydraulic system is placed in stand-by. If the electronic control unit detects any activity requiring hydraulic pressure from the first pump, such as a control input by the operator, the energy saving mode is interrupted. The electronic control unit will immediately connect the accumulator to the second pump, which is then set to operate as a motor. This will cause the first pump to be driven to supply hydraulic fluid to the hydraulic implement. In this way, the operator need not wait for the engine to start, as fluid pressure from the accumulator is immediately available for controlling and operating the at least one fluid implement. At the same time, the torque supplied by the second pump will drive the gearbox and crank the prime mover. The engine control unit will resume the fuel injection and/or the ignition of the prime mover, which will then start and drive the system as normal. When normal operation is resumed, the second pump will immediately begin to charge the accumulator.

The invention further relates to a method for controlling a fluid system comprising a controllable first pump unit for supplying fluid pressure to at least one implement; a prime mover arranged to drive the first pump unit; wherein the first pump unit is installed on an outgoing power take off (PTO) for the implement fluid system, a controllable second pump unit connected to a fluid accumulator, and at least one sensor for determining the state of the fluid system. The method comprises the steps of: controlling the prime mover to supply a driving torque to the first pump unit to supply fluid pressure to the implement in response to the load on the implement; controlling the prime mover to drive the second pump unit for accumulating fluid pressure in the accumulator during periods of low load on the implement; and controlling fluid pressure from the accumulator to drive the second pump unit as a motor to assist the prime mover during periods of high demand by supplying an additional driving torque in excess of the available driving torque from the prime mover for driving the first pump unit.

The method may involve controlling the prime mover to drive the second pump unit in response to a pressure signal indicating the pressure in the accumulator. The second pump unit may, for instance, be driven when the load on the implement is below a first predetermined value. During charging of the accumulator, the implement is supplied with fluid pressure solely by the first pump unit. The first pump unit may be a pump unit that is either operated as a pump driven by the prime mover or as a motor driven by fluid from the implement. In the latter case, the first pump unit may be used to brake or control the motion of the implement. The operational mode of the first pump unit is selected by controlling the pump swash plate angle in a positive or a negative direction.

During a period of high load or when a peak load on the implement is detected, the method involves controlling fluid pressure from the accumulator to drive the second pump unit to provide additional torque for driving the first pump unit in response to the load on the implement. In addition to controlling the fluid pressure from the accumulator, the displacement of the second pump unit can also be controlled. The pressure from the accumulator can be controlled by means of a controllable valve and the displacement of the second pump unit is controlled by varying the stroke of the device. The controllable valve may be an electrically controlled valve used for opening or closing the fluid conduit connecting the accumulator to the second pump. The stroke of the device operated as a pump or a motor may be controlled by changing the angle of a swash plate in the device. The method involves controlling fluid pressure from the accumulator to drive the second pump unit as a motor, when the sensed load on the implement is above a first predetermined value.

In operation, charging of the accumulator is achieved by moving the pump swash plate angle in a positive direction. The second pump unit will then act as a pump, pumping fluid into the accumulator. This mode of operation is determined by an electronic control unit for the system, which detects if power is available for charging. Charging may occur at low prime mover load conditions and/or during retardation of the outgoing drive shaft, for instance when braking the implement using the prime mover. The latter case allows fluid pressure from the implement to be regenerated. The electronic control unit will monitor valve command signals, from an operator or an auxiliary system, and pressure levels in the implement system, using output signals from various sensors, such as pressure sensors. The electronic control unit can also directly detect the actual load on the prime mover. A measurement of the actual load can be obtained directly from an engine speed sensor on the engine crankshaft, or by accessing engine related data from a separate electronic control unit provided for controlling the engine. Based on this information and a set of predetermined rules programmed into the electronic control unit the charging process may be controlled.

Discharging of fluid pressure from the accumulator is done by moving the swash plate angle of the second pump unit in a negative direction. The second pump unit then acts as a fluid motor supplying additional torque onto the drive shaft for the first pump unit. This mode of operation is determined by the electronic control unit when it is detected that additional torque is required in order to not stall or overload the first pump unit drive shaft. Adding torque to the drive shaft only occurs at high drive shaft load and or high prime mover load. The electronic system will sense valve command signals, from an operator or an auxiliary system, and pressure levels in the implement system using output signals from various sensors, such as pressure sensors. Based on this information and a set of predetermined rules programmed into the electronic control unit the level of additional torque from the second pump unit can be controlled.

This torque equalizing device will make it possible to use of more energy efficient machines by allowing downsizing of essential components, such as prime movers and transmissions in fluid operated systems, in particular in fluid operated implements and systems for vehicles.

BRIEF DESCRIPTION OF DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

EMBODIMENTS OF THE INVENTION

Figure 1:
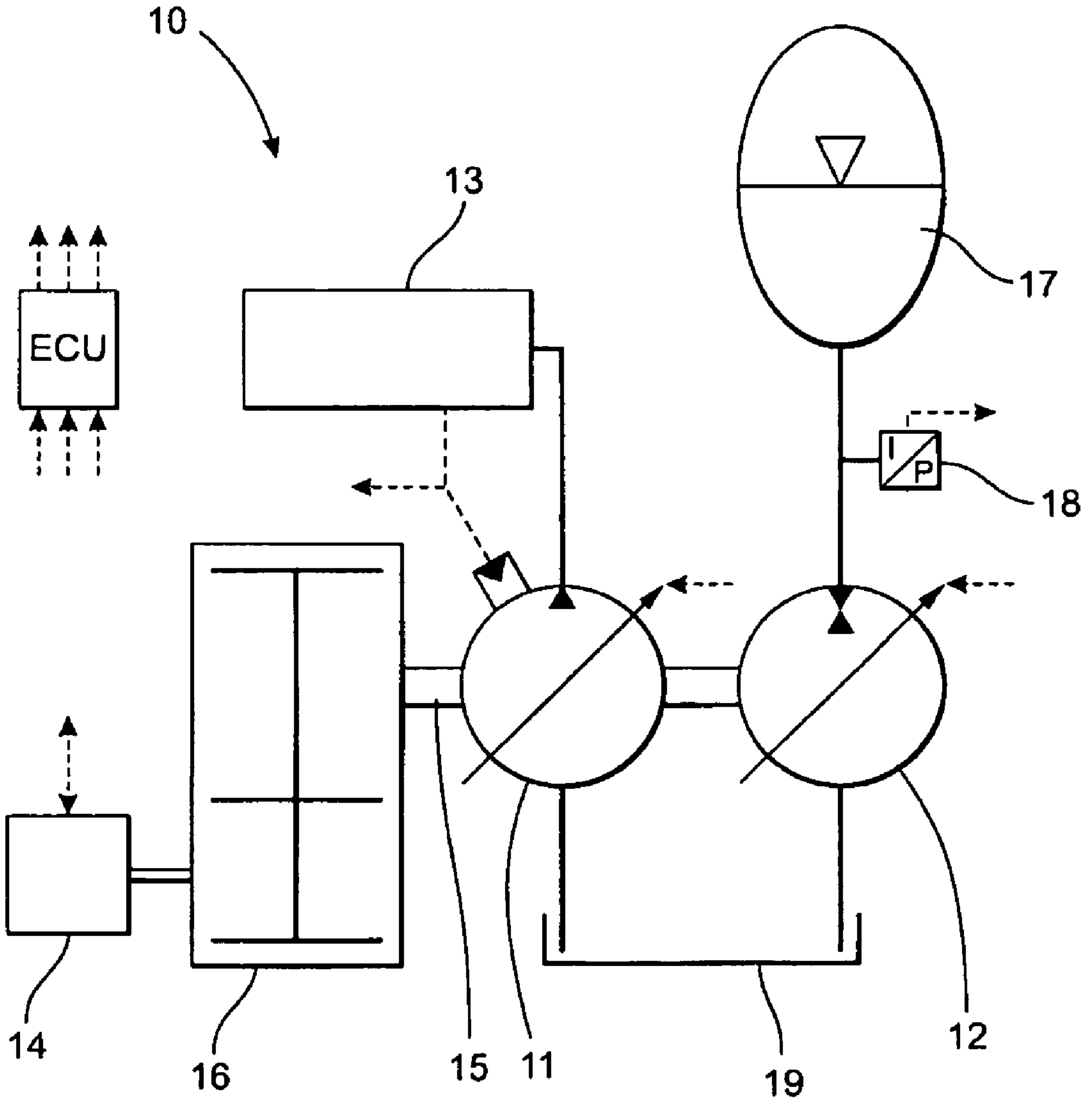
FIG. 1 shows a schematic illustration of a hydraulic system according to a first embodiment of the invention.

FIG. 1 shows a schematic illustration of a hydraulic system according to a first embodiment of the invention. The figure shows a hydraulic system 10 comprising a controllable first pump unit in the form of a variable displacement pump 11 for supplying hydraulic pressure to a hydraulically driven device in the form of a hydraulic cylinder 13. The controllable first pump unit will hereafter be referred to as the first pump 11. A prime mover in the form of an engine 14 is arranged to supply a driving torque to a drive shaft 15 for the first pump 11 via a transmission in the form of a hydrodynamic gearbox 16. The hydraulic system 10 further comprises a controllable second pump unit in the form of a variable displacement pump 12 connected to a hydraulic accumulator 17. The controllable second pump unit will hereafter be referred to as the second pump 12. The engine 14 is further arranged to supply a driving torque to the second pump 12. The second pump 12 is arranged to be driven as a pump and accumulate hydraulic pressure in the accumulator 17 during periods of low demand, when the load on the hydraulic cylinder 13 is below a first predetermined value. The load is measured as a hydraulic pressure level and an output signal from a pressure sensor (not shown) on the cylinder 13 is supplied as an input signal to the first pump 11 to control the angle of a swash plate in the first pump 11. A further pressure sensor 18 is provided between the second pump 12 and the accumulator 17 to monitor the hydraulic pressure in the accumulator 17. A two way valve or a burst valve can also be provided between the second pump 12 and the accumulator 17. Hydraulic fluid is supplied from and returned to a tank 19 connected to both the first pump 11 and the second pump 12. An electronic control unit ECU is arranged to receive output signals from the pressure sensors and an engine speed sensor. Signals received and transmitted to and/or from the various components of the hydraulic system are indicated in dashed lines in the figures. Depending on the current load on the hydraulic cylinder 13, the current pressure in the accumulator and the engine speed, the electronic control unit ECU will output control signals to regulate the angle of the swash plates in the first pump 11 and/or the second pump 12 and, if required, the speed of the engine 14. During periods of low demand, the available torque from the engine 14 exceeds the torque required by the first pump 11 to supply the hydraulic cylinder 13 with hydraulic pressure. The electronic control unit ECU will then control the engine 14 to operate at a predetermined constant speed for optimum fuel consumption. At this speed, the torque supplied from the engine 14 is sufficient to drive the first pump 11 and to operate the second pump 12 as a pump to charge the accumulator 17. When a predetermined pressure is achieved in the accumulator, a signal transmitted from the pressure sensor 18 will cause the electronic control unit ECU to adjust the angle of the swash plate in the second pump 12 to maintain this pressure.

If the load on the hydraulic cylinder 13 increases, the electronic control unit ECU will first control the angle of the swash plate of the first pump 11 in order to increase the pressure supplied to the hydraulic cylinder 13. Depending on the current pressure in the accumulator, the electronic control unit ECU may simultaneously adjust the angle of the swash plate of the second pump 12 to either maintain the pressure or to continue charging the accumulator 17. Depending on the torque required for this operation, the engine speed may also need to be adjusted to compensate for a higher demand of torque.

During periods of high demand, the electronic control unit ECU will first control the angle of the swash plate of the first pump 11, as described above. If the swash plate is adjusted to its maximum angle, the electronic control unit ECU will try to adjust the engine speed to increase the available torque from the engine 14. When the load on the hydraulic cylinder 13 increases above a predetermined value, the torque supplied by the engine 14 will reach the maximum rated torque that can be handled by the transmission. During a period of peak load, the torque supplied by the engine is less than the torque required by the first pump 11 to supply the hydraulic cylinder 13 with sufficient pressure. In this case, hydraulic pressure from the accumulator 17 is arranged to drive the second pump 12 as a motor to assist the engine 14 in order to supply an additional driving torque in excess of the available driving torque from the engine 14. The electronic control unit ECU will sense such a condition and will respond by setting the angle of the swash plate in the second pump 12 in a negative direction. The angle is dependent on the pressure required by the hydraulic cylinder 13. The electronic control unit ECU will determine the additional torque required for driving the first pump 11 to supply the required pressure. Subsequently, the swash plate of the second pump 12 is set to produce at least this additional torque. This regulation is carried out until the peak load condition ends or until the pressure in the accumulator 17 is insufficient for supplying additional torque. When the peak load condition ends, the angle of the swash plate in the second pump 12 is immediately set in a positive direction, allowing it to operate as a pump in order to recharge the accumulator 17. Should the pressure signal from the pressure sensor 18 indicate that the pressure in the accumulator drops below a predetermined pressure before the peak load condition ends, then the electronic control unit ECU will transmit a warning signal to the operator.

Figure 2:
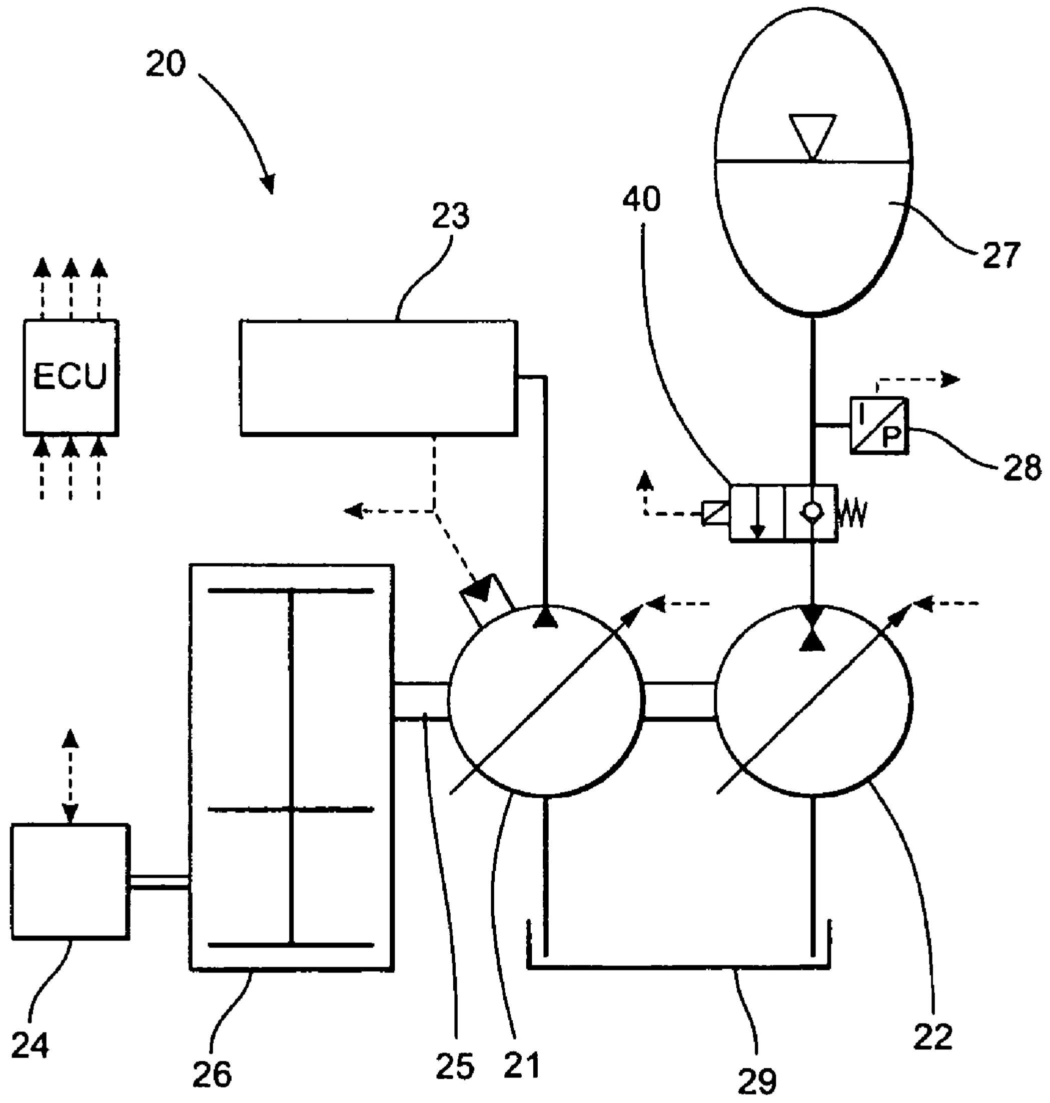
FIG. 2 shows a schematic illustration of a hydraulic system according to a second embodiment of the invention.

FIG. 2 shows a schematic illustration of a hydraulic system according to a second embodiment of the invention. As in FIG. 1, FIG. 2 shows a hydraulic system 20 comprising a controllable first pump unit in the form of a variable displacement pump 21 for supplying hydraulic pressure to a hydraulically driven device in the form of a hydraulic cylinder 23. The controllable first pump unit will hereafter be referred to as the first pump 21. A prime mover in the form of an engine 24 is arranged to supply a driving torque to a drive shaft 25 for the first pump 21 via a transmission in the form of a hydrodynamic gearbox 26. The hydraulic system 20 further comprises a controllable second pump unit in the form of a variable displacement pump 22 connected to a hydraulic accumulator 27. The controllable second pump unit will hereafter be referred to as the second pump 22. The engine 24 is further arranged to supply a driving torque to the second pump 22. The second pump 22 is arranged to be driven as a pump and accumulate hydraulic pressure in the accumulator 27 during periods of low demand, when the load on the hydraulic cylinder 23 is below a first predetermined value. The load is measured as a hydraulic pressure level and an output signal from a pressure sensor (not shown) on the cylinder 23 is supplied as an input signal to the first pump 21 to control the angle of a swash plate in the first pump 21. A further pressure sensor 28 is provided between the second pump 22 and the accumulator 27 to monitor the hydraulic pressure in the accumulator 27. A two way valve or a burst valve can also be provided between the second pump 22 and the accumulator 27. Hydraulic fluid is supplied from and returned to a tank 29 connected to both the first pump 21 and the second pump 22. An electronic control unit ECU is arranged to receive output signals from the pressure sensors and an engine speed sensor. Signals received and transmitted to and/or from the various components of the hydraulic system are indicated in dashed lines in the figures. Depending on the current load on the hydraulic cylinder 23, the current pressure in the accumulator and the engine speed, the electronic control unit ECU will output control signals to regulate the angle of the swash plates in the first pump 21 and/or the second pump 22 and, if required, the speed of the engine 24.

During periods of low demand, the available torque from the engine 24 exceeds the torque required by the first pump 21 to supply the hydraulic cylinder 23 with hydraulic pressure. The electronic control unit ECU will then control the engine 24 to operate at a predetermined constant speed for optimum fuel consumption. At this speed, the torque supplied from the engine 24 is sufficient to drive the first pump 21 and to operate the second pump 22 as a pump to charge the accumulator 27. When a predetermined pressure is achieved in the accumulator, a signal transmitted from the pressure sensor 28 will cause the electronic control unit ECU to adjust the angle of the swash plate in the second pump 22 to maintain this pressure. In order to retain the hydraulic pressure in the accumulator 27, a controllable two-way valve 40 is connected between the second pump 22 and the pressure sensor 28. A non-return valve in the two-way valve 40 allows the second pump 22 to pressurize the accumulator 27. The two-way valve 40 can be displaced to an open position against a return spring in order to release pressure from the accumulator 27.

The hydraulic system can also be placed in an energy saving mode during periods of low activity. Examples of such periods may be when the electronic control unit detects that there has been no demand for hydraulic pressure from the implement or that the operator has not provided any input to the controls over a predetermined period of time. The energy saving mode can be initiated after a predetermined period of time or in response to detected state corresponding to a number of pre-programmed conditions stored in the electronic control unit ECU. One condition that must be fulfilled for initiation of the mode is that the accumulator 27 must be sufficiently charged to be able to at least start the engine. The latter condition may occur if the second pump 22 has not had sufficient time to charge the accumulator 27 after a previous engine-off condition or energy saving mode period. In this case, the hydraulic system is prevented from entering the energy saving mode. The required degree of charge of the accumulator is determined by the power required for starting the engine. Ideally, the accumulator is fully, or nearly fully, charged.

When the energy saving mode is initiated, an engine control unit will interrupt the fuel injection and/or the ignition of the engine 24. The engine 24 is then stopped and the hydraulic system 20 is placed in stand-by. If the electronic control unit ECU detects any activity requiring hydraulic pressure from the first pump 21, such as a control input by the operator, the energy saving mode is interrupted. The electronic control unit ECU will immediately connect the accumulator 27 to the second pump 22 by opening the two-way valve 40. This will cause the second pump 22 to operate as a motor and the first pump 21 to be driven to supply hydraulic fluid to the hydraulic cylinder 23. Provided that sufficient pressurized fluid is available from the charged accumulator, the hydraulic cylinder 23 can be operated immediately, before the engine 24 has been re-started. At the same time, the torque supplied by the second pump 22 will drive the gearbox 26 and crank the engine 24. The engine control unit will resume the fuel injection and/or the ignition of the engine 24, which will then start and drive the hydraulic system 20 as normal.

Figure 3:
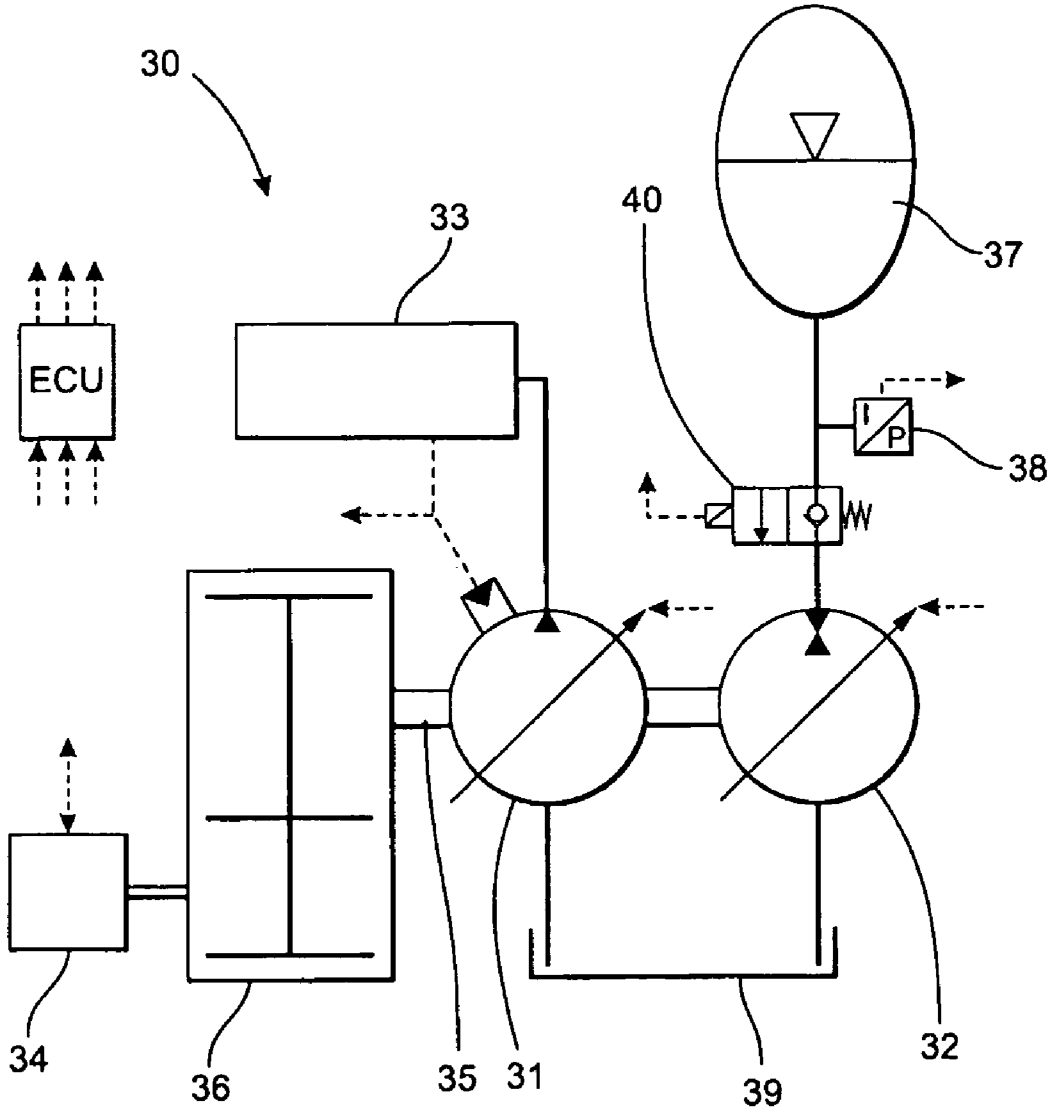
FIG. 3 shows a schematic illustration of a hydraulic system according to a third embodiment of the invention.

FIG. 3 shows a schematic illustration of a hydraulic system according to a third embodiment of the invention. The figure shows a hydraulic system 30 comprising a controllable first pump unit 31 in the form of a first variable displacement device for supplying hydraulic pressure to a hydraulically driven device in the form of a hydraulic cylinder 33. The controllable first pump unit will hereafter be referred to as the first pump 31. A prime mover in the form of an engine 34 is arranged to supply a driving torque to a drive shaft 35 for the first pump 31 via a transmission in the form of a hydrodynamic gearbox 36. The hydraulic system 30 further comprises a controllable second pump unit in the form of a variable displacement pump 32 connected to a hydraulic accumulator 37. The controllable second pump unit will hereafter be referred to as the second pump 32. The engine 34 is further arranged to supply a driving torque to the second pump 32. The second pump 32 is arranged to be driven as a pump and accumulate hydraulic pressure in the accumulator 37 during periods of low demand, when the load on the hydraulic cylinder 33 is below a first predetermined value. The load is measured as a hydraulic pressure level and an output signal from a pressure sensor (not shown) on the cylinder 33 is supplied as an input signal to the first pump 31 to control the angle of a swash plate in the first pump 31. A further pressure sensor 38 is provided between the second pump 32 and the accumulator 37 to monitor the hydraulic pressure in the accumulator 37. Hydraulic fluid is supplied from and returned to a tank 39 connected to both the first pump 31 and the second pump 32. In order to retain the hydraulic pressure in the accumulator 37, a controllable two-way valve 40 is connected between the second pump 32 and the pressure sensor 38. A non-return valve in the two-way valve 40 allows the second pump 32 to pressurize the accumulator 37. The two-way valve 30 can be displaced to an open position against a return spring in order to release pressure from the accumulator 37. An electronic control unit ECU is arranged to receive output signals from the pressure sensors and an engine speed sensor. Depending on the current load on the hydraulic cylinder 33, the current pressure in the accumulator and the engine speed, the electronic control unit ECU will output control signals to regulate the angle of the swash plates in the first pump 31 and/or the second pump 32 and, if required, the speed of the engine 34.

During periods of low demand, the available torque from the engine 34 exceeds the torque required by the first pump 31 to supply the hydraulic cylinder 33 with hydraulic pressure. The electronic control unit ECU will then control the engine 34 to operate at a predetermined constant speed for optimum fuel consumption. At this speed, the torque supplied from the engine 34 is sufficient to drive the first pump 31 and to operate the second pump 32 as a pump to charge the accumulator 37. When a predetermined pressure is achieved in the accumulator, a signal transmitted from the pressure sensor 38 will cause the electronic control unit ECU to adjust the angle of the swash plate in the second pump 32 to zero. The second pump 32 is then allowed to idle in order to minimize the torque requirement and reduce the load on the engine 34.

If the load on the hydraulic cylinder 33 increases, the electronic control unit ECU will first control the angle of the swash plate in the first pump 31 in order to increase the pressure supplied to the hydraulic cylinder 33. Depending on the current pressure in the accumulator, the electronic control unit ECU may simultaneously adjust the angle of the swash plate of the second pump 32 to continue charging the accumulator 37, if required. Depending on the torque required for this operation, the engine speed may also need to be adjusted to compensate for a higher demand for torque.

During periods of high demand, the electronic control unit ECU will first try to adjust the angle of the swash plate of the first pump 31 and/or to adjust the engine speed to increase available torque from the engine 34. When the load on the hydraulic cylinder 33 increases above a predetermined value, the maximum torque supplied by the engine 34 is less than the torque required by the first pump 31 to supply the hydraulic cylinder 33 with sufficient pressure. In this case, hydraulic pressure from the accumulator 37 is arranged to drive the second pump 32 as a motor to assist the engine 34 in order to supply an additional driving torque in excess of the available driving torque from the engine 34. The electronic control unit ECU will sense such a condition and will respond by opening the two-way valve 40 and setting the angle of the swash plate in the second pump 32 in a negative direction. The angle is dependent on the pressure required by the hydraulic cylinder 33. The electronic control unit ECU will determine the additional torque required for driving the first pump 31 to supply the required pressure. Subsequently, the swash plate of the second pump 32 is set to produce at least this additional torque. This regulation is carried out until the peak load condition ends or until the pressure in the accumulator 37 is insufficient for supplying additional torque. When the peak load condition ends, the two-way valve 40 is closed and the angle of the swash plate in the second pump 32 is immediately set in a positive direction, allowing it to operate as a pump in order to recharge the accumulator 37. Should the pressure signal from the pressure sensor 38 indicate that the pressure in the accumulator drops below a predetermined pressure before the peak load condition ends, then the electronic control unit ECU will close the two-way valve 40 and transmit a warning signal to the operator.

In operation, charging of the accumulator is normally achieved by moving the pump swash plate angle of the second pump 32 in a positive direction. The second pump 32 unit will then act as a pump, pumping fluid into the accumulator 37. This mode of operation is determined by an electronic control unit for the system, which detects if power is available for charging. Alternatively, charging may also occur when braking or lowering the hydraulic cylinder, using the first pump 31 as a motor. Hydraulic fluid from the hydraulic cylinder 33 will then drive the first pump 31 and return to the tank 39. The torque supplied to the drive shaft 35 can be used to drive the second pump 32 as a pump to charge the accumulator 37. The latter operating condition allows fluid pressure from the hydraulic cylinder to be regenerated.

The invention is not limited to the above examples, but may be varied freely within the scope of the appended claims. For instance, the hydraulic systems shown in FIGS. 1 and 3 can also be placed in an energy saving mode during periods of low activity, as described in connection with FIG. 2 above.

What is claimed is:

1. Fluid system comprising a controllable first pump unit for supplying fluid pressure to at least one implement; a prime mover arranged to supply a driving torque to the first pump unit; the first pump unit arranged to supply fluid pressure to the at least one implement, a controllable second pump unit connected to a fluid accumulator; the prime mover arranged to supply a driving torque to the second pump unit; the second pump unit arranged to accumulate fluid pressure in the accumulator during periods of low demand; and fluid pressure from the accumulator arranged to drive the second pump unit to assist the prime mover during periods of high demand in order to supply an additional driving torque in excess of the available driving torque from the prime mover.

2. Fluid system according to claim 1, wherein the second pump unit is a variable displacement device, provided with means for controlling the displacement of the pump in a positive and a negative direction.

3. Fluid system according to claim 2, wherein the second pump unit is operated as pump when driven by the prime mover.

4. Fluid system according to claim 1, wherein the first pump unit is a variable displacement pump.

5. Fluid system according to claim 1, wherein the first pump unit is a variable displacement device, provided with means for controlling the displacement of the pump in a positive and a negative direction.

6. Fluid system according to claim 5, wherein the second pump unit is operated as pump driven by first variable displacement device unit.

7. Fluid system according to claim 1, where the first and second pump units are electrically controlled.

8. Fluid system according to claim 1, wherein the first pump unit is controlled by a load sensing device on the implement.

9. Fluid system according to claim 1, wherein the second pump unit is controlled by a load sensing device on the implement and a pressure sensor connected to the accumulator.

10. Fluid system according to claim 1, wherein the prime mover is connected to a transmission device arranged to drive the first pump unit.

11. Fluid system according to claim 10, wherein the maximum driving torque supplied to the first pump unit by the prime mover and the second pump unit is greater than the maximum driving torque that can be transmitted by the transmission.

12. Fluid system according to claim 1, wherein the first pump unit is installed on an outgoing power take off.

13. Method for controlling a fluid system comprising a controllable first pump unit for supplying fluid pressure to at least one implement; a prime mover arranged to drive the first pump unit; a controllable second pump unit connected to a fluid accumulator and at least comprising:

- controlling the prime mover to supply a driving torque to the first pump unit to supply fluid pressure to the implement in response to the load on the implement;
- controlling the prime mover to drive the second pump unit for accumulating fluid pressure in the accumulator during periods of low load on the implement;
- controlling fluid pressure from the accumulator to drive the second pump unit as a motor to assist the prime mover during periods of high demand by supplying an additional driving torque in excess of the available driving torque from the prime mover for driving the first pump unit.

14. Method according to claim 13 further comprising controlling the prime mover to drive the second pump unit in response to a pressure signal indicating the pressure in the accumulator.

15. Method according to claim 13 further comprising controlling the prime mover to drive the second pump unit when the load on the implement is below a first predetermined value.

16. Method according to claim 13 further comprising controlling the fluid pressure from the accumulator to drive the second pump unit in response to the load on the implement.

17. Method according to claim 13 further comprising controlling fluid pressure from the accumulator to drive the second pump unit when the load on the implement is above a first predetermined value.

18. Method according to claim 13 further comprising controlling fluid pressure from the accumulator to drive and start the prime mover.

* * * * *